United States Patent [19]

Bell et al.

[11] 4,002,105
[45] Jan. 11, 1977

[54] FLUID ACTUATED GEAR CHANGING SYSTEM

[76] Inventors: Charles Gilbert Bell, 2220 S. Helen, Sioux City, Iowa 51106; Michael M. Randolph, 2814 Nebraska St., Sioux City, Iowa 51104

[22] Filed: July 23, 1975

[21] Appl. No.: 598,249

Related U.S. Application Data

[62] Division of Ser. No. 522,214, Nov. 8, 1974, Pat. No. 3,945,265.

[52] U.S. Cl. .................................. 92/62; 92/65; 92/75; 92/151
[51] Int. Cl.² ......................................... F01B 7/10
[58] Field of Search ............ 92/65, 62, 167 R, 151, 92/411 A, 75

[56] References Cited

UNITED STATES PATENTS

| | | | |
|---|---|---|---|
| 1,181,110 | 5/1916 | Carter | 92/65 |
| 2,761,473 | 9/1956 | Denton | 91/167 |

FOREIGN PATENTS OR APPLICATIONS

| | | | |
|---|---|---|---|
| 79,632 | 1950 | Czechoslovakia | 91/62 |
| 301,531 | 11/1917 | Germany | 91/167 |

*Primary Examiner*—Paul E. Maslousky
*Attorney, Agent, or Firm*—Roylance, Abrams, Berdo & Kaul

[57] ABSTRACT

A unique double acting piston and cylinder assembly is disclosed wherein the assembly can be moved to any one of three positively determined positions by application of fluid pressure to any one of three ports. The cylinders include first and second pistons attached to an output shaft for movement therewith, third and fourth pistons slidably mounted on the shaft between the first and second ones, a first stop within the cylinder to limit the movement of the adjacent first and third pistons, a second stop to limit the axial movement of the second and fourth pistons, an extension on the third piston and extending toward the first piston for reaching beyond the first stop to contact and move the first piston, an extension carried by the fourth piston and protruding toward the second piston for reaching beyond the second stop in contacting and moving the second piston, and first, second and third ports on the cylinder for passing fluid under pressure respectively between the two inner, third and fourth, pistons and at the ends of the cylinder whereby any of the three positions can be obtained with pressure supplied to one port with the other two vented. Vents in the cylinder between the first and third pistons and the second and fourth pistons prevent build up of a pressure differential therebetween.

4 Claims, 23 Drawing Figures

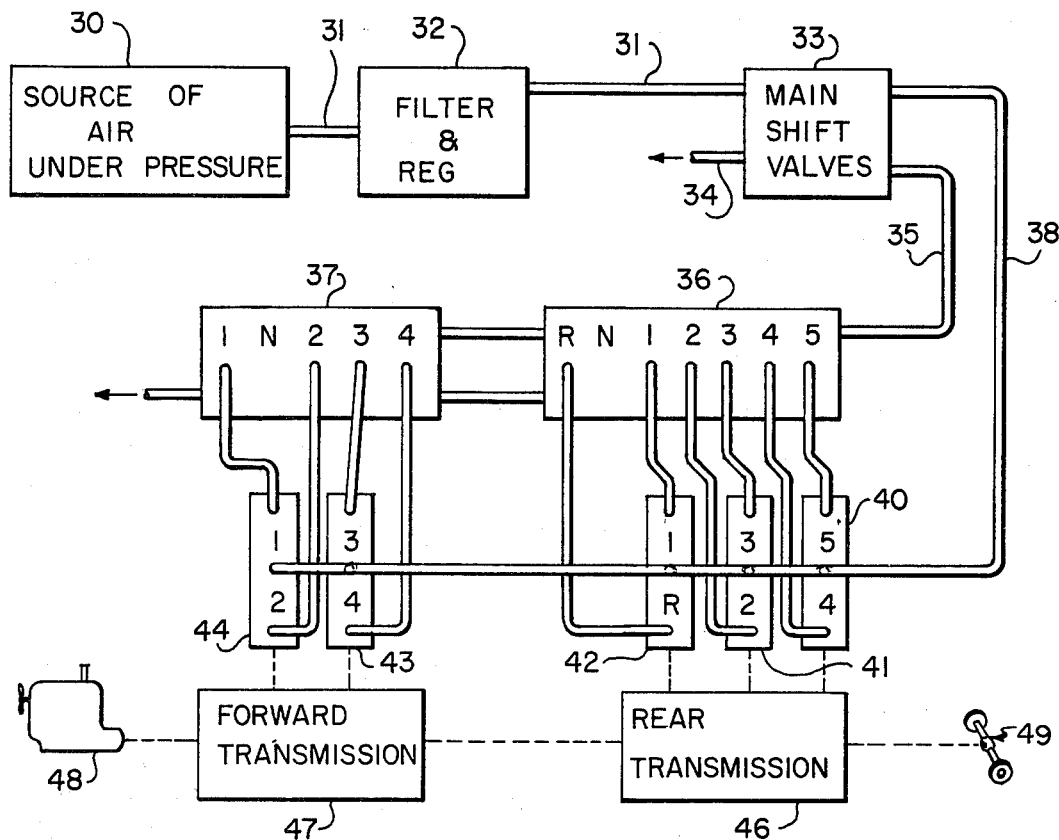
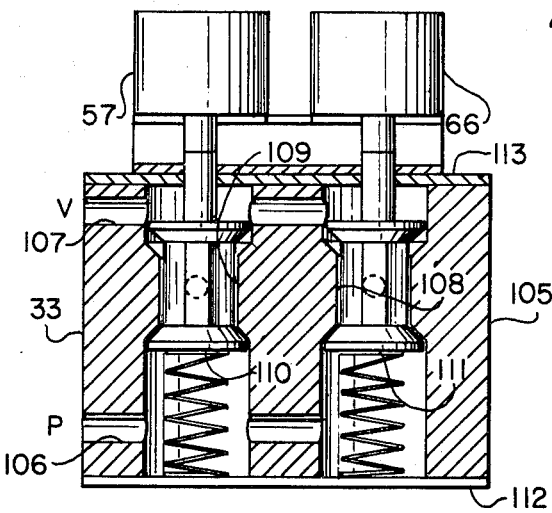
FIG. 6
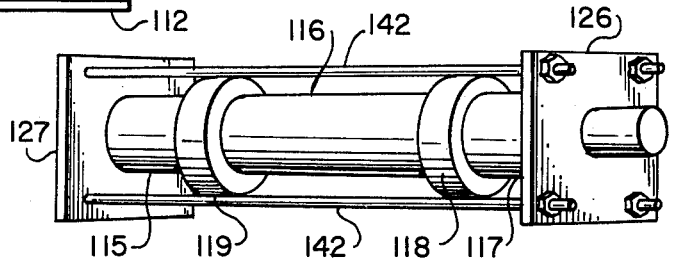
FIG. 7

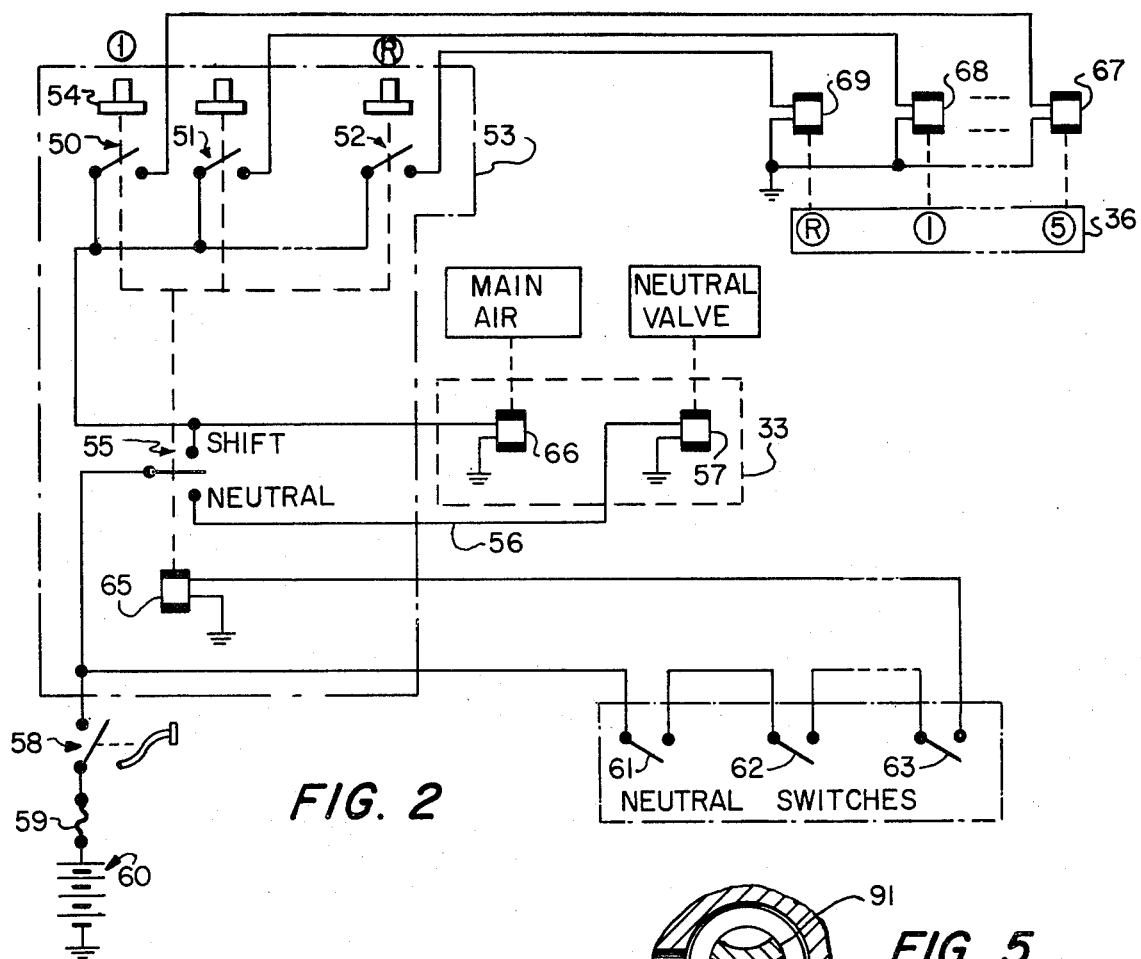
FIG. 2
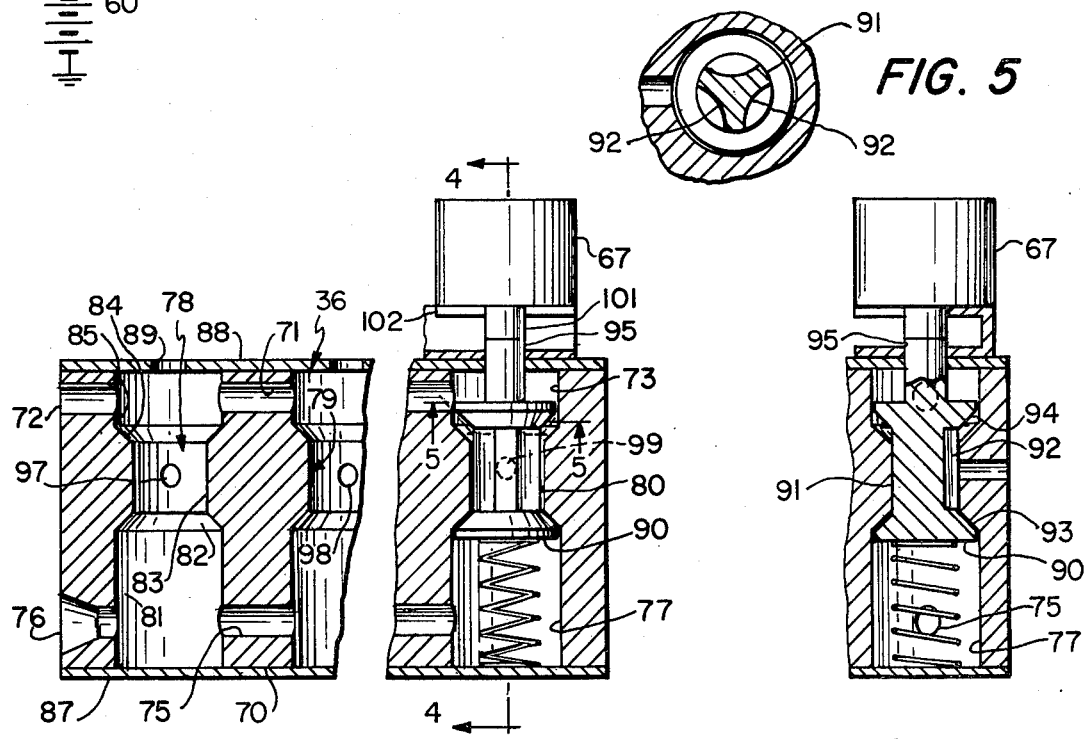
FIG. 3
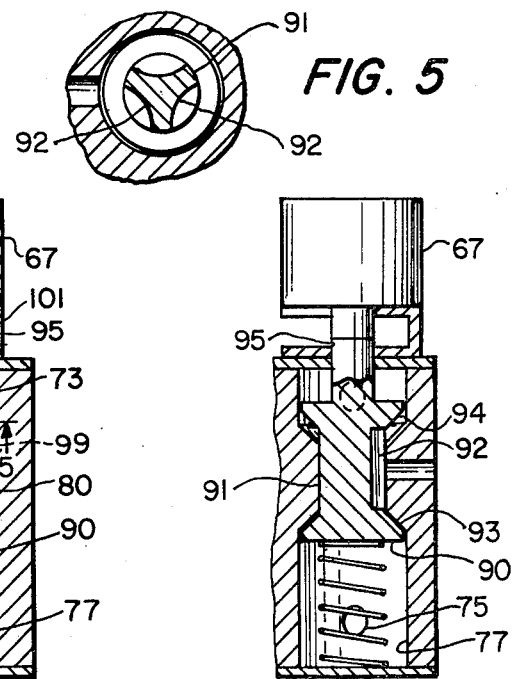
FIG. 5
FIG. 4

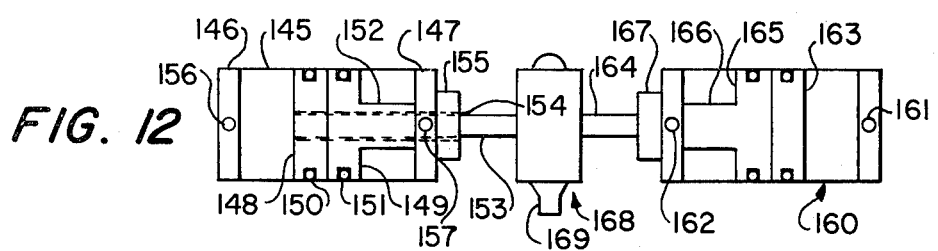
FIG. 12
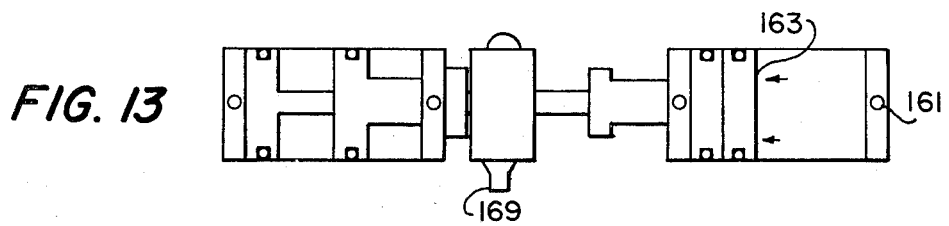
FIG. 13
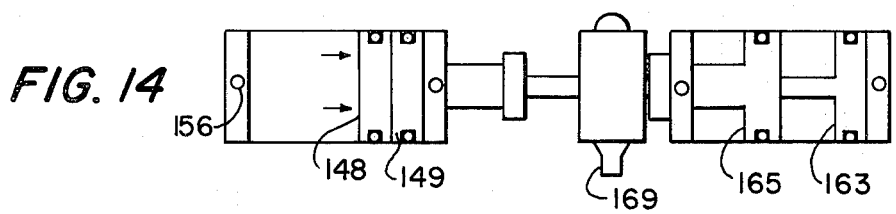
FIG. 14
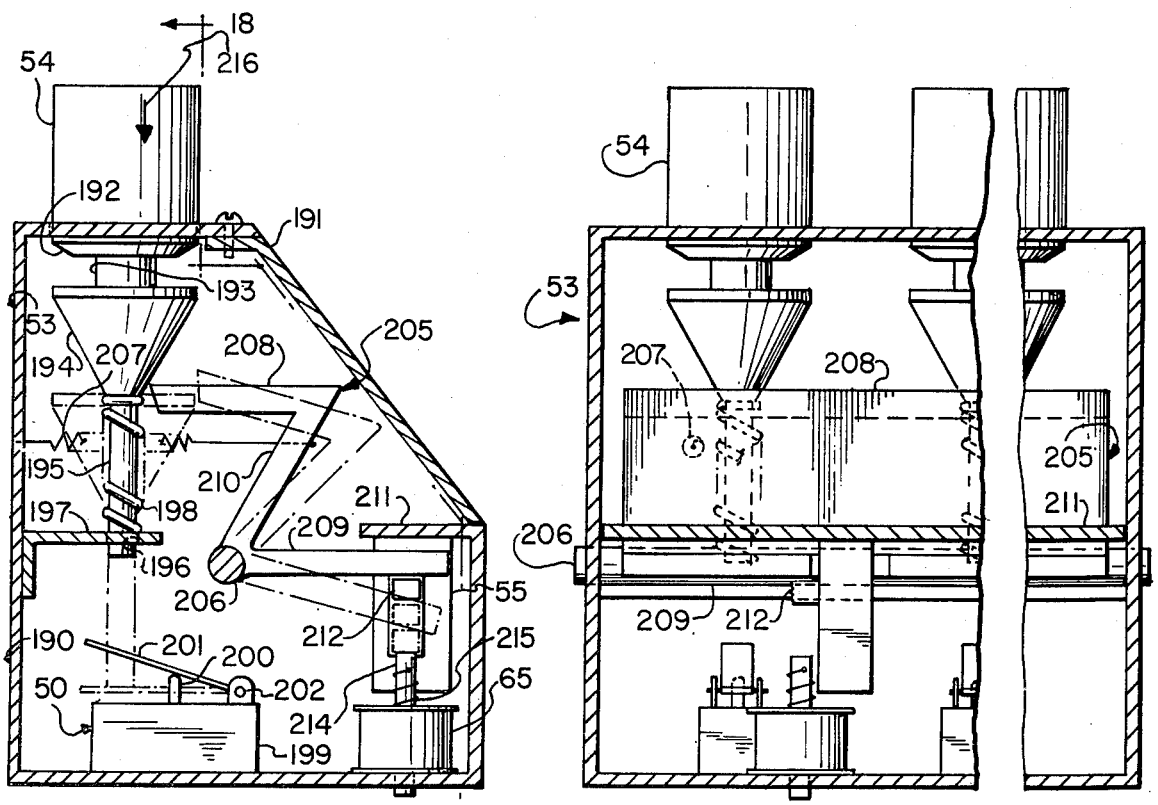
FIG. 17
FIG. 18

FLUID ACTUATED GEAR CHANGING SYSTEM

This is a division of application Ser. No. 522,214, filed Nov. 8, 1974, now U.S. Pat. No. 3,945,265.

This invention relates to gear changing mechanisms and is particularly directed to gear changing control systems and to fluid actuated devices for accomplishing gear changes.

BACKGROUND OF THE INVENTION

In recent years gear changing mechanisms in conventional automobiles have changed in great part from manual transmissions to automatic transmissions of a a hydraulic nature. Even in many smaller trucks and buses, the mechanical transmission has been replaced.

However, in larger trucks the change from manual transmissions to those of the automatic variety has not been a completely successful effort for a number of reasons, a primary one being that the torque range transmitted by a hydraulic transmission is simply not adequate to cope with the great loads imposed thereon by the inertia of a large highway-type articulated trailer vehicle. Thus, in the great majority of the larger trucks manual transmissions will still be found.

Also as a direct result of the large and heavy loads imposed upon the drive trains of these trucks, it has been found necessary to use more than one transmission. The range of gear ratios needed to cope with the full spectrum of operating conditions of a large truck, from initiating movememnt from a stop up to maintaining speeds of 60 miles per hour and more, using a power plant of reasonable size, required incorporation of a gear changing mechanism having, commonly, 16 or 20 different gear ratios or speeds. For various reasons having nothing in particular to do with the present invention, the truck maufacturing industry almost universally accomplishes this speed change using two transmissions rather than attempting to build a single transmission having 16 gear changes.

As a result of this, the truck driver handling a large vehicle must cope with shifting two manual transmissions. The procedure, normally, is to place one transmission at one speed and then cause the other transmission to be shifted through its range, where upon it is then necessary to again shift the first and simultaneously down shift the second so that the procedure can be repeated. As will be recognized, this clearly necessitates the simultaneous shifting of two transmissions while the vehicle is in motion, a task which requires both of the driver's hands or the assistance of a second person in the vehicle cab. It should also be noted that this changing operation is not an infrequent occurrence; beginning from a standing stop, the driver finds it necessary in passing through city traffic to make 15 to 20 shifts in an interval of a few blocks.

It will be recognized that the situation outlined above presents a severe safety problem, in addition to the obvious requirements of strength and skill on the part of the truck driver.

Also forming a part of the background for this invention is the matter of present construction of manual transmissions. An example of a typical gear changing mechanism can be found in U.S. Pat. No. 1,372,227, Huggins in which yokes 19, 20 and 21 are coupled to movable gears within the transmission, the yokes being carried by rails 23, 24 and 25 which are moved by an external mechanism. In Huggins, they are moved electrically, and in the more usual situation, they are connected to a gear shift lever which is attached to the top of the transmission and which extends into the range of the driver's reach. Other examples of transmissions and techniques for changing the gear ratios therein will be found in U.S. Pat. Nos. 2,137,961, Vorech and 2,297,026, Sanford et al. A slightly different kind of transmission in which the gear changing forks are connected to a different form of linkage is shown in U.S. Pat. No. 2,244,092, Wheeler.

From these, it will be seen that the degree of motion available at the lower end of the gear shift lever is very small and must necessarily be so to limit the required extent of motion of the operator-handled end of the gear shift lever to a reasonable range of motion. This limited motion of the end of the shift lever inside the transmisson housing necessitates close spacing and limited motion of the rails, or other linkages, and the forks carried thereby, requiring that they be placed very close together and imposing other design limitations upon the transmission mechanism.

A further factor in connection with conventional manual transmissions relates to the speed with which a shift can be made. It would be ideal if a change from one gear to the next could be a substantially instantaneous one. With conventional manual transmissions, some time lapse is involved simply because the operator cannot move the mechanical elements with sufficient speed and precision. As a result, speed changes in the components involved occur and it is necessary to return the components to matching speeds, or reasonably close to matching speeds, before the shifting process can be completed. This necessitates the well-known "double-clutching" procedure necessary for many trucks.

OBJECTS OF THE INVENTION

It is therefore an object of the present invention to provide a gear changing apparatus in which the change can be accomplished automatically and rapidly to minimize variations between running speeds of the components. Another object of the present invention is to provide a gear changing system in which fast shifting of one or more separate transmissions of a mechanical type is accomplished, the shifting of multiple transmissions being accomplished substantially simulaneously.

A further object is to provide a gear changing system having an easily operated selector of an electrical or electropneumatic type which does not present a safety hazard by requiring excessive manual dexterity on the part of the operator.

Another object is to provide a system in which an electropneumatic control system delivers fluid under pressure to a plurality of operating cylinders of a double acting type, each cylinder being connected to a rail or linkage of the gear changing mechanism and each being capable of assuming three positively determined positions.

A still further object is to provide a gear changing system in which unique single acting pistons are cooperatively employed in pairs to provide pneumatic means for assuming three positively determined positions selectively.

Yet another object is to provide a unique double acting cylinder capable of assuming three positively determined positions. A still further object is to provide a single acting piston of a unique type which is capable of assuming two positively determined positions by itself and which is also capable, when used in conjunction with a second identical device to provide an apparatus capable of assuming three positively determined positions, permitting considerable flexibility in the relative orientations of the output shafts thereof.

A still further object is to provide a technique for converting an existing mechanical transmission to an automatic gear changing system in accordance with the invention.

SUMMARY OF THE INVENTION

Briefly described, the invention contemplates providing a system for changing the gear ratio of a transmission of a type having a plurality of gears which are movable into and out of positions of meshing engagement with other gears to establish a neutral or drive train condition in the transmission, movable fork means for repositioning the movable gears, and a linkage for supporting and moving the fork means, including a source of fluid under pressure, a plurality of pneumatic cylinder means, each having an output shaft coupled to a linkage, for positioning the linkage, the cyliner means each having three ports for passing fluid under pressure and being responsive to the application of fluid under pressure at a first one of the ports to move the shaft to a central position, a second one of the ports to move the shaft to a position displaced in one direction from the central position, and a third one of the ports to move the shaft to a position displaced in the opposite direction from the central position, a control valve unit having a plurality of valve means for selectively directing fluid under pressure from the source to ports of the cylinder means, the plurality of valve means including a first valve means for simultaneously applying fluid under pressure to the first port of all of the cylinder means and the remaining ones of the plurality of valve means being operable for individually applying fluid under pressure to selected ones of the second and third ports, and shift selector means for sequentially actuating the first valve of the control valve means and then a selected one of the remaining ones of said valve means to cause a selected one of said cylinder means to move its output shaft and the rail coupled thereto to a new shift position. The invention also contemplates means for detecting the existence of all of the cylinders in a neutral condition before permitting the shift to occur. Further in accordance with the invention, there is provided a fluid actuated cylinder and piston positioning assembly having three positive positions comprising a cylinder having end walls, a shaft, first and second pistons attached to the shaft and movable therewith, third and fourth pistons slidably mounted on the shaft between the first and second pistons with the third piston adjacent the first piston and the fourth piston adjacent the second piston, first stop means attached to an extending into the cylinder between the first and third pistons for limiting axial motion of the first and third pistons, second stop means attached to and extending into the cylinder between the second and fourth pistons for limiting axial motion of those pistons, means carried by the third piston and extending toward the first piston for reaching beyond the first stop means and contacting and moving the first piston, means carried by the fourth piston and extending toward the second piston for reaching beyond the second stop means and contacting and moving the second piston, first, second and third means on the cylinder for passing fluid under pressure respectively between said third and fourth pistons and axially beyond the outer limits of motion of said first and second pistons whereby said assembly assumes three different positively established positions in response to the application of fluid pressure to any one of the first, second and third means with the other two vented.

Also in accordance with the present invention is a piston and cylinder positioning assembly comprising a cylinder having end walls and ports adjacent the end walls for passing fluid under pressure, a shaft extending through one of the end walls, a first piston attached to the shaft for axial movement therewith in the cylinder, a second piston surrounding the shaft in sliding relationship between the first piston and the one end wall, a sleeve extending from and movable with the second piston to and through the one end wall, means in the one end wall for providing a fluid tight seal with the sleeve, and means for limiting the axial movement of the second piston in a direction away from the one end wall, the means being ineffective to limit the movement of the first piston. The stop means is contemplated as constituting a threaded member on the sleeve which is adjustable to alter the stroke relationship.

BRIEF DESCRIPTION OF THE DRAWINGS

In order that the manner in which the foregoing and other objects are attained in accordance with the invention can be understood in detail, preferred embodiments of the invention will be described employing the accompanying drawings, which form a part of this specification, and wherein:

FIG. 1 is a schematic diagram, partially in block form, of the fluid handling portion of a gear changing system according to the invention;

FIG. 2 is a schematic diagram of the electrical portion of a control system for use with the fluid handling system of FIG. 1;

FIG. 3 is a side elevation, in partial section and foreshortened, of a valve control assembly usable in the apparatus of FIG. 1;

FIG. 4 is a section of the elevation along line 4—4 of FIG. 3;

FIG. 5 is a section along lines 5—5 of FIG. 3;

Figure 8:
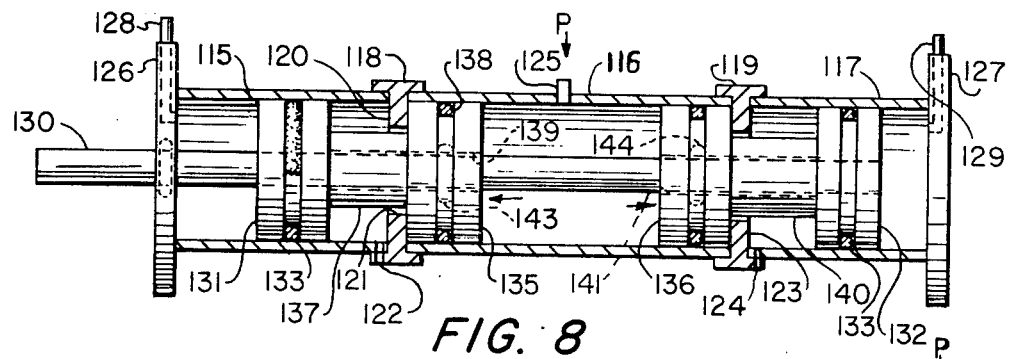
Figure 9:
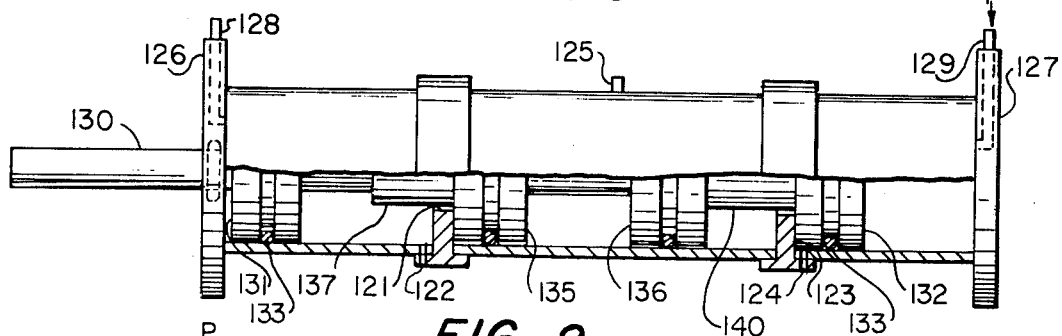
Figure 10:
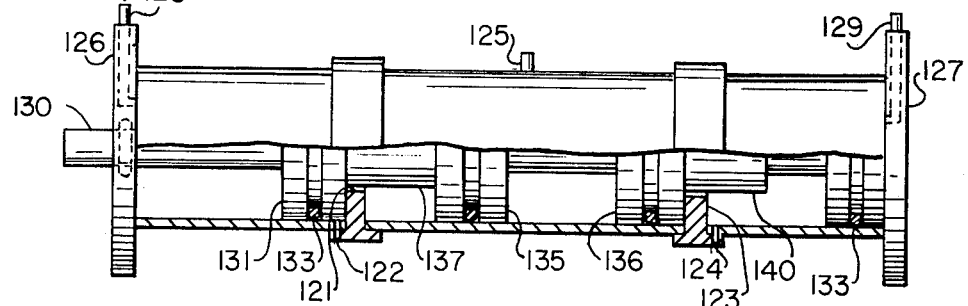
Figure 11:
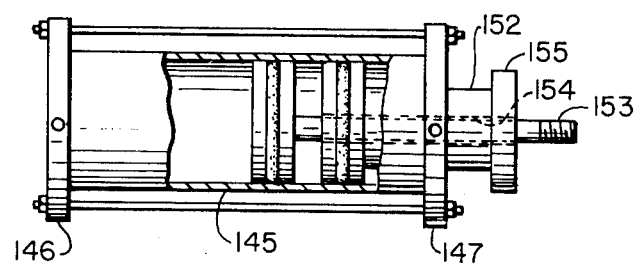
Figure 15:
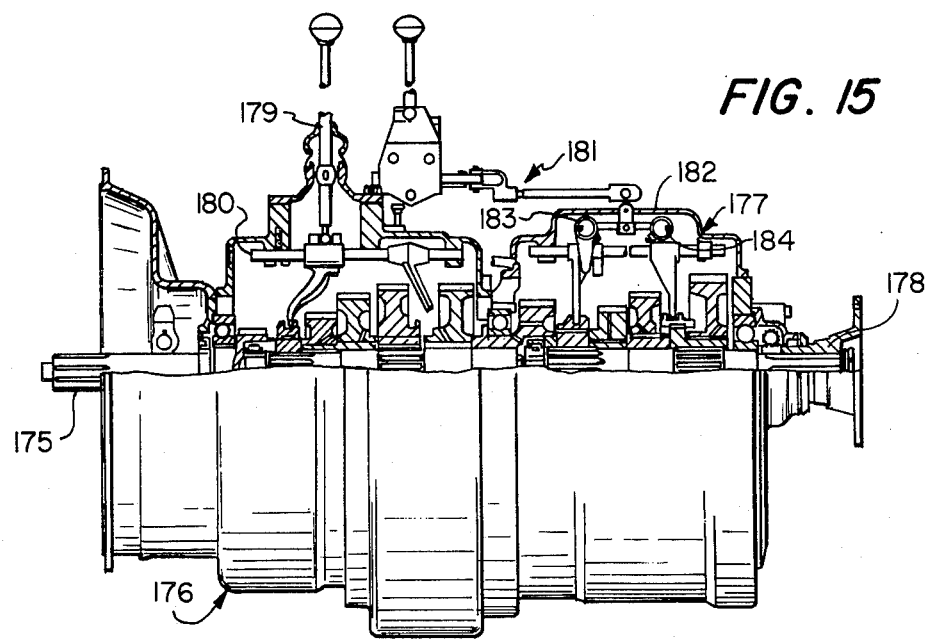
Figure 16:
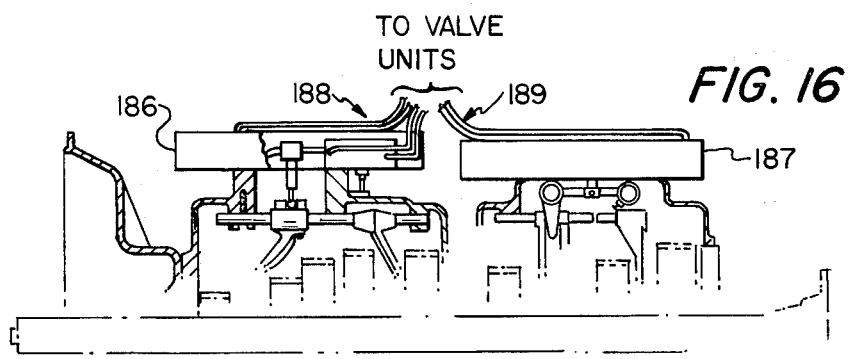
Figure 21:
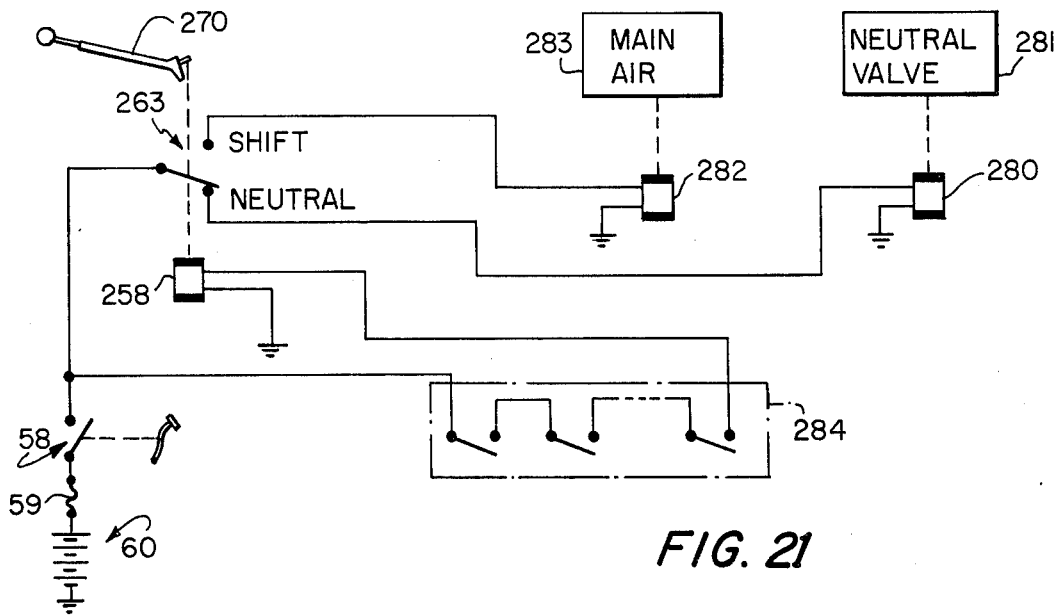
Figure 19:
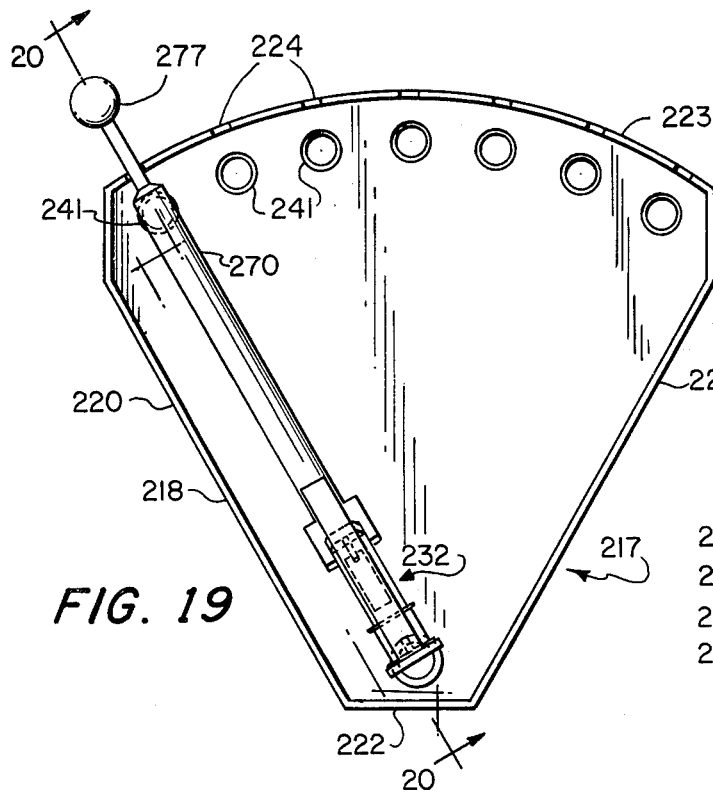
Figure 20:
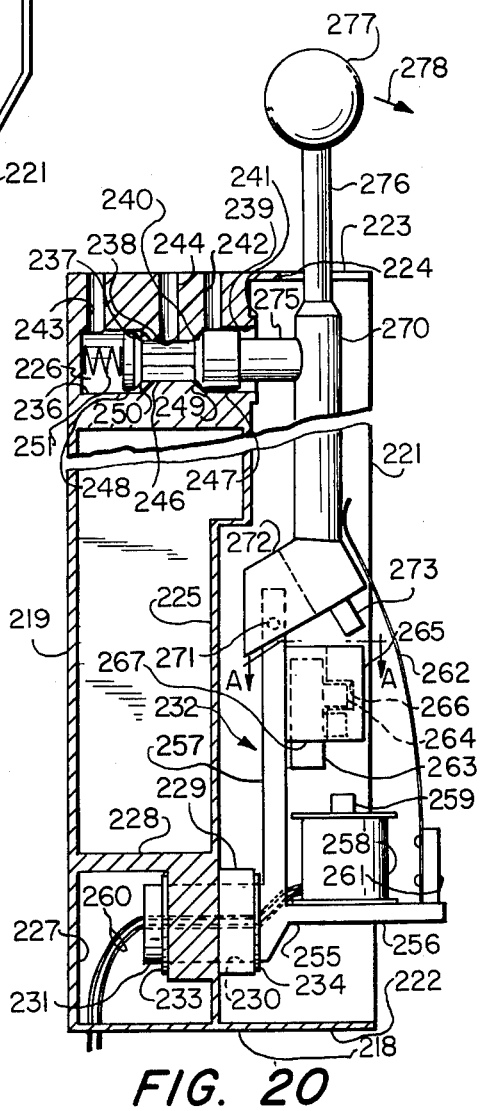
Figure 22:
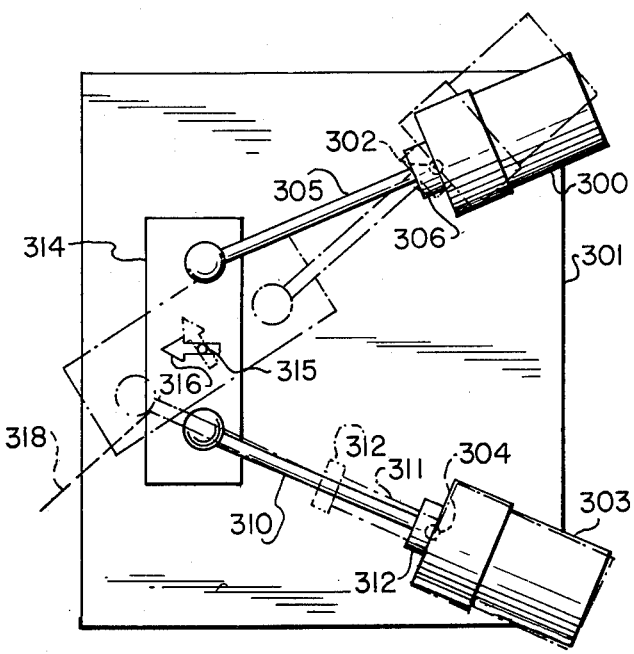
Figure 20:
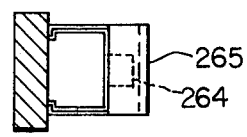

FIFG. 6 is a side elevation, in partial section, of a main air control valve usable in the apparatus of FIG. 1;

FIG. 7 is a perspective view of a double acting fluid actuated cylinder and piston assembly in accordance with the invention;

FIGS. 8–10 are side elevations, in section, showing a double acting fluid actuated cylinder and piston assembly in accordance with the present invention, illustrating the three positively determined positions thereof;

FIG. 11 is a side elevation, in partial section, of a single acting piston in accordance with the invention;

FIGS. 12–14 are partially schematic views of pairs of single acting pistons as shown in FIG. 11 in the three possible positively determined positions assumable thereby;

FIGS. 15 and 16 are partially schematic views illustrating the application of the actuating devices of FIGS. 8–14 in a kit to convert a conventional transmission to an automatically actuated system;

FIG. 17 is a side elevation, in partial section, showing a selector mechanism usable in the apparatus of FIG. 2;

FIG. 18 is a section of an elevation along lines 18—18 of FIG. 17;

FIG. 19 is a front elevation of a pneumatic selector mechanism as an alternative to the apparatus of FIGS. 17 and 18;

FIG. 20 is a side elevation of the apparatus of FIG. 19;

FIG. 20a is a detail of FIG. 20 along lines A—A;

FIG. 21 is a schematic diagram of an electrical system usable with the apparatus of FIGS. 19 and 20; and FIG. 22 is a schematic diagram illustrating an embodiment of a system incorporating two single acting cylinders.

DESCRIPTION OF THE PREFERRED EMBODIMENTS

Referring now to FIG. 1, it will be seen that the basic gear changing system includes a source of high pressure fluid 30 which supplies fluid on a conduit 31. It will be observed that the fluid to be considered in the present application is air and that the system in its various embodiments will be considered as a totally pneumatic system. However, it is contemplated that the system could take form as a hydraulic system in which case substitution of return lines or plumbing to reservoirs for atmosphere venting and similar modifications would be effected.

Conduit 31 can be provided with an air regulator and filter 32 and supplies high pressure air to a main control valve unit 33. Unit 33 receives high pressure on conduit 31 and vents through a conduit 34 to atmosphere. Valves within unit 33, to be described hereinafter in detail, supply pressured air on a conduit 35 to shift control valve units 36 and 37, to be described in greater detail hereinafter, and also on a conduit 38, to the neutral port of a plurality of fluid actuated shift cylinders 40–44. It will be observed that unit 33 serves to connect conduits 35 and 38 to the source of pressured fluid or else vents those conduits to the atmosphere.

Units 36 and 37 will be described in greater detail hereinafter, but can briefly be described as connecting conduits leading from the shift cylinders to either pressure fluid or atmosphere, depending upon control signals received by the valve elements therein. Of particular significance in the functional relationship of these components is the sequence of events which occur upon activation of the system. In response to selected controls which will be described, the main shift valve unit 33 first provides high pressure air on neutral conduit 38 which supplies air to each of units 40–44. Each of these units is designed to respond to this application of pressure to assume a neutral state, this state being defined as one in which the units assume a central location, midway between two extreme locations which each unit is capable of assuming. Each of the fluid actuated units is coupled mechanically to a shift rail or similar linkage in one of the transmissions 46 and 47, unit 40 being connected to a shift rail in rear transmission unit 46 and unit 44 being connected to a shift rail in forward transmission unit 47. The transmission units control and transmit power from the main power plant 48 of the vehicle to the differential and drive wheel assembly indicated generally at 49. Placement of each of units 40–44 in a neutral position also places the associated shift rails and movable gears within the transmission units in their neutral positions. These units each include sensing means responsive to shift rail position capable of providing an electrical signal indicative of the arrival at a neutral position. When all such signals have been received, the main shift valves 33 are actuated to provide high pressure air on conduit 35, which pressure is received at each of the movable valve elements in units 36 and 37. An electrical signal is received by one such valve unit in each of units 36 and 37, activating a solenoid therein and permitting high pressure air to be conducted to one of the ports indicated in FIG. 1 by a letter or number representative of the speed of the transmission associated with that port. The high pressure air is then conducted via one of the conduits extending from valve units 36 and 37 to fluid actuated cylinder means 40–44 and operates to move the selected fluid actuated unit to the selected speed. The shift rail is thus moved and the appropriate gears engaged in each of the transmissions, appropriate to the circumstances of the vehicle, as determined by the operator.

It will be observed that the system is designed to return to neutral and thereafter to immediately proceed to the shift position selected. This means that any single shift is accomplished as quickly as any other shift, regardless of gear level or the like. If desired, lower speed shifts, such as from first to second, can be accomplished wth a fluid actuated unit having a larger diameter than the higher speed units, this having the effect of accomplishing the shift less quickly, but with more power, a set of circumstances more appropriate to the lower gear ratios. Each of units 36 and 37 also includes a neutral button N to permit the operator to shift the transmission to neutral without selecting any other ratio.

An electrical control system suitable for use in connnection with the apparatus of FIG. 1 is shown in FIG. 2 which shows a schematic diagram of a simplified selector control circuit for use with one set of shift control valves. A set of selector switches indicated generally at 50, 51 and 52 is provided in a shift control selector module 53 which is located in the driver's compartment of the vehicle. Switches 50–52 are representative of a larger number which would normally be provided. These switches are operated by push buttons and are mechanically coupled as a group, to the movable contact of a single-pole, three-position shift control switch indicated generally at 55. The mechanical interconnection of these switches, an example of which will be described in greater detail hereinafter, is such that depression of any single switch, such as switch 50, by manual depression of its associated push button 54, causes that push button and its switch to be mechanically latched in a depressed position and, in the process of its being depressed, releases any other switch button which might have been previously latched. Additionally, the mechanical depression of the push button moves the movable member of switch 55 from its central position, in which no electrical connection is made, to the lower or neutral position in which the movable contact is electrically connected to a conductor 56 which is connected to one terminal of a solenoid 57, the other terminal of which is grounded. Solenoid 57 is mechanically coupled to a neutral valve in main shift valve unit 33 and, when the solenoid is energized, will cause unit 33 to supply fluid under pressure on conduit 38 to the various central ports of the actuating units as described with reference to FIG. 1. However, the movement of switch 55 thus far described does not cause energization of solenoid 57. The moveable contact of switch 55 is connected to one contact of a normally open clutch switch indicated generally at 58, which switch is not closed until the clutch pedal is operated. The other side of switch 58 is connected, as through a fuse 59, to the vehicle battery indicated generally at 60.

The movable contact of switch 55 is also connected to a group of detector switches 61, 62 and 63 which are, again, representative of a larger number of switches which would normally be employed. Switches 61–63 are neutral switches and serve the function of detecting when actuating units such as units 40–42 (FIG. 1), for example, have arrived at neutral positions. These switches are connected in series with each other and with the energizing winding of a relay 65 which is mechanically connected to the movable element of switch 55 and, when energized, causes that switch element to move to the shift position.

The fixed contact in the shift position of switch 55 is connected to one terminal of a solenoid 66 in unit 33, the other terminal of solenoid 66 being grounded. Solenoid 66 actuates the main air valve in unit 33 and, when energized, permits unit 33 to conduct high pressure air to conduit 35 (FIG. 1) which delivers air under pressure to shift units 36 and 37.

The fixed shift contact of switch 55 is also connected to one side of each of switches 50–52. The other terminal of each of these normally open switches is connected to a solenoid in one of the shift valve units 36 or 37. For example, switch 50 is connected to one terminal of solenoid 67, switch 51 is connected to a solenoid 68 and switch 52 is connected to a solenoid 69, the other terminals of each of these solenoids being connected to ground. The mechanically movable portions of solenoids 67–69 are connected to valve elements within, for example, unit 36 to alter the air flow therein, as will be subsequently described. Movement of one of the valve elements causes the actuation of one of actuators 40–42 and movement of a shift fork in transmission unit 46.

A sequence of operation of the electrical portion of the system will now be described using switch 50 as an example. Depression of button 54 closes switch 50 and simultaneously moves switch 55 to the neutral position. The circuit is not energized but these switches are mechanically latched in the positions to which they are moved until something further occurs. It will be observed that by the selection of button 54 this is equivalent to the selection of ultimate energization of relay 67 and a shift in unit 36 which will be assumed to be a shift into fifth gear.

The shift situation is now set up and, when desired, the operator depresses the clutch closing switch 58 and energizing the system. Switch 55 being in the neutral position, solenoid 57 is energized and the fluid under pressure is supplied on conduit 38 to the various actuating cylinders. Those cylinders are immediately driven to their neutral positions and the arrival thereof is detected by switches 61–63, which switches are closed as soon as their associated actuating units and gear assemblies are in the neutral position, the completion of this series circuit immediately causing energization of relay 65. Relay 65 moves the movable element of switch 55 from the neutral to the shift position, causing energization of winding 66 and, substantially simultaneously, energization of solenoid 67 through the circuit including switch 50. The valve associated with solenoid 67 is immediately moved to permit air to flow to the appropriate actuating cylinder which would be cylinder 42 in this example, causing that cylinder to move to the fifth gear position and immediately shifting the rear transmission into a fifth gear status.

It will be observed that this shift occurred in two steps, going to neutral and then into the new shift position, but that it occurred in rapid sequence, the only delay being the time involved in going to neutral (if, in fact, any part of the transmission was not already in neutral) and then moving immediately to the new shift position as promptly as the relays and solenoids are actuated.

As will be understood from a subsequent discussion of the fluid actuated cylinders themselves, these cylinders and the conventional transmission shift rails are detented so that, once moved to a position, they remain in that position without the application of further energy. Thus, the selected shift valve remains in a pressure-applying position for a relatively short interval of time, only long enough to permit the actuator to complete the shift. Then, the clutch pedal can be released whereupon the control system is deenergized with the transmission in its new ratio. From this, it will be seen that the driver can select the next combination of gear ratios at his leisure and depress the appropriate buttons in advance of the time to shift. Then, when the appropriate shift time arrives, the operator need only depress the clutch pedal which immediately energizes the system, causes the shift to neutral and then into the new selected position almost instantaneously, after which the clutch pedal can be released in the new ratio.

In FIG. 3 is shown in greater detail a preferred embodiment of a shift selector valve mechanism of a type which would be used as either unit 36 or 37, or both, in the system of FIG. 1. In that regard, it will be observed that one could provide, in a truck situation wherein, for example, 16 gear ratios are needed, a selector box having 16 buttons, a valve control unit having 16 valves and an assortment of tubing connecting these valves to appropriate cylinders coupled to the front and rear transmissions. However, it is regarded as a simpler approach to provide two sets of selector buttons and two shift control valve units, as shown in FIG. 1, this being an arrangement which is consistent with the presently employed techniques of shifting familiar to truck operators.

As shown in FIG. 3, a valve unit such as unit 36 consists of a body 70 in the form of a block of metal or plastic having a generally rectangular exterior shape. A vent port is provided in the form of a longitudinal bore 71 which extends from an opening 72 at one end of body 70, near the upper surface thereof, and ends, as a blind bore, at a wall 73 near the opposite end of the body. A pressure port is provided in the form of a bore 75 which extends parallel to bore 71 near the opposite side of the body longitudinally from an opening 76 to a wall 77 at the same end of the body as wall 73. A plurality of interconnecting transverse openings such as 78, 79 and 80 interconnect the vent and pressure ports, each such opening having a relatively narrow central portion which opens into wider portions forming valve seats. In the case of opening 78, a larger diameter section 81 terminates at a frustoconical surface 82 which extends to narrowed portion 83. An oppositely disposed frustoconical portion 84 extends outwardly to a larger diameter portion 85 which opens into vent port 71.

At the bottom of body 70 a continuous plate 87 is provided and firmly attached to the body, gasketed as necessary, to close the openings used to form the transverse openings. In similar fashion, at the top of the body, a plate 88 is provided, this being continuous except for openings 89 which provide access for operating the valve members to be placed therein.

One such valve member 90 is shown in opening 80 and is also shown in FIGS. 4 and 5, to which reference is concurrently made. Valve member 90 includes a central portion 91 which is in the form of a fluted cylinder, the specific valve body shown having three longitudinal concave recesses 92. At one end of the valve body is a valve member having a frustoconical valve surface 93 which is dimensioned and slanted to mate with the valve seat in opening 80. At the other end is a similar valve member having a surface 94 similarly intended to mate with the valve seat at the vent end. An extension 95 of smaller diameter protrudes through an opening 89 in plate 88 to permit operation of the valve. A coil compression spring 96 extends between the lower portion of valve member 90 and plate 87, urging the valve in an upwardly direction, causing extension 95 to protrude beyond plate 88.

The body of the actuator is also provided with a plurality of air passages 97, 98 and 99 which extend perpendicularly from openings 80 to conduit couplings at the exterior of the body. These openings are for the purpose of making connection with the conduits extending between valve unit 36 and the fluid actuated cylinders 40-42 as shown in FIG. 1 and perform the function of either venting those conduits or providing fluid under pressure thereto to operate the units.

Attached to and above each valve location is a solenoid such as solenoid 67 which is provided with a downwardly extending movable portion 101 which is movable further downwardly upon energization of the solenoid to operate the valve member. A bracket 102 is provided to support and retain the solenoid in the proper location.

As will be seen, particularly with reference to FIG. 3-5, the operation of the valve unit can be discussed with reference to the single valve member 90 illustrated in its entirety, the other valve members having substantially identical operation. It will be assumed that fluid under pressure is provided to port 75 through opening 76 so that such fluid exists along the entire port. It will also be assumed that each transverse opening is occupied by a valve which is in the same position as valve 90, and it can further be assumed that the vent port is vented to the atmosphere. Opening 99 and its associated conduit is therefore in communication with vent port 71 through the fluid portions 92 of valve body 91, portion 94 being spaced from its associated valve seat in the upper position. The valve is maintained in this position by compression spring 96 until subjected to some other force. Upon energization of solenoid 67, extension 101 moves downwardly, pressing against extension 95 and causing the valve body to move downwardly until surface 94 contacts the valve seat. At that time, surface 93 is moved away from its associated valve seat and a passage is provided for fluid under pressure from port 75 through the open valve portion at the lower end thereof and along the fluted portions 92 of body 91 to opening 99 and its associated conduit. The conduit is thereby supplied with fluid pressure and the actuator associated therewith is caused to change position. Upon deenergization of the solenoid, spring 96 causes the valve to return to the position illustrated in FIG. 3 wherein the opening is again vented to atmosphere.

Turning now to FIG. 6, it will be seen that the main shift valve unit 33 is very similar in nature to the shift selector valve unit described with reference to FIGS. 3–5 and can, in fact, be incorporated as an additional unit or an additional portion of the valve shift unit. Considered, however, as a separate device, it will be seen to comprise a body 105 having longitudinal blind bores 106 and 107 constituting the pressure and vent ports, respectively. Transverse openings 108 and 109 including the narrow portions and frustoconical valve seat portions identical to those described with reference to FIG. 3 provide a location for valve bodies 110 and 111 which constitute the neutral and shift valves, respectively, which control application of fluid pressure to the neutral ports of the fluid actuated cylinder units previously described and the application of high pressure air to opening 76 of port 75 of unit 36 as described with reference to FIG. 3. Solenoids 57 and 66 are provided and function as described with reference to FIG. 2 in a manner identical to the solenoids described with reference to FIGS. 3–5. A bottom plate 112 and top plate 113 are similarly provided for the substantially identical purpose.

The fluid actuated cylinders themselves will now be described with reference to FIGS. 7–10. As shown in these Figures, the cylinders include a tubular body portion which is conveniently constructed using three tubes 115, 116 and 117 of substantially identical inner and outer diameter joined in co-axial relationship at ring and stop members 118 and 119. Each of members 118 and 119 is T-shaped in cross section with the outer cross portion of the T forming a flange to which the cylindrical portions are joined in rigid mechanical connection. The inwardly extending annular portion of member 118 forms a first stop means 120 comprising an annular wall which is radial and which defines a central opening 121. A vent 122, which is always open, extends through member 118 and the adjacent portion of cylindrical member 115. Member 119 similarly forms a radially inwardly extending second stop means 123 and has a vent 124 extending therethough and through adjacent cylindrical member 117. A port 125 extends through the wall of cylinder 116 and is connectable to a fluid conduit as previously indicated.

The outer casing of the assembly is completed by the addition of end walls 126 and 127. Ports 128 and 129 are provided in the end walls to permit the passage of fluid under pressure to or from the interior of the adjacent cylindrical volumes, although such ports can also conveniently be provided in the cylindrical members themselves.

A shaft 130 extends through end wall 126, the outer portion thereof being connectable to a shift rail or linkage for movement of a shift fork. Within the cylindrical body disc-like pistons 131 and 132 are fixedly attached to shaft 130 for movement therewith, piston 132 being at the opposite extreme end of shaft 130 from that which protrudes beyond the actuating cylinder. Each piston is provided with an annular groove carrying a sealing ring 133, in conventional fashion.

A piston 135 and a piston 136 complete the basic elements within the cylinder. Piston 135 includes a first portion which is substantially identical in shape to pistons 131 and 132 and also includes an extension sleeve 137 which surrounds shaft 130 and protrudes from the left hand face of piston 135 toward piston 131. It will be observed that the outer diameter of sleeve 137 is smaller than the opening 121 defined by the radially inwardly extending portion of ring 118. A sealing ring 138 is also provided surrounding piston 135. While sleeve 137 can be provided as a separate freely movable body interposed between pistons 135 and 131, it will be regarded herein as being integrally formed on piston 135. Piston 135 and its associated fixedly attached sleeve are provided with a bore 139 through which shaft 130 can freely slide. Thus, movement of piston 135 does not directly act upon shaft 130, such action being restricted to action upon piston 131 which is fixedly attached to the shaft.

Piston 136 similarly includes a piston portion substantially identical to 131 and 132 and a sleeve 140 which extends toward piston 132, the outer diameter of the sleeve being smaller than the opening defined by the inwardly extending portions of ring 124. Also, piston 136 is provided with an inner central bore 141 which is larger than shaft 130 so that the piston is in free sliding relationship therewith. Sealing rings 143 and 144 are fitted in annular grooves in bores 139 and 141 to prevent pressure leakage through those bores. Sleeve 140 can also be a separate body.

As seen in FIG. 7, the end walls can be retained in position by a plurality of bolts 142 having threaded end portions extending through the end wall to which retaining nuts can be applied.

FIGS. 8-10 illustrate the three positively determined positions which can be assumed by the piston and cylinder assembly. In FIG. 8 there is shown a neutral position in which the various piston elements are located symmetrically with respect to the center of the assembly. This position is assumed whenever pressure is applied to port 125, providing pressure in the chamber defined by inwardly facing surfaces of pistons 135 and 136. These pistons move in opposite directions toward their respective end walls and, if shaft 130 was not already in the neutral position, the distal ends of extensions 137 or 140 contact the associated pistons 131 or 132 and move them to the neutral position as illustrated. Upon arriving at this position, the apparatus remains in the state shown.

Application of pressure to port 129 causes an increase of pressure at the end chamber adjacent end wall 127 and results in the position shown in FIG. 9. The applied pressure acts against the wall of piston 132 which faces end wall 127, causing piston 132 to the left, carrying with it shaft 130 and, by virtue of contact with the end of extension 140, piston 136. Piston 135 is not affected when going to this position from the neutral position shown in FIG. 8. Piston 131 is, of course, carried along with the shaft and moves to a location adjacent end wall 126. It will be observed that the motion of the shaft is positively determined by the abutment of piston 132 against annular portion 123 of ring 124. No differential balancing of pressure is involved in arriving at this or any other position of the piston assembly. It will also be observed that the volume existing between pistons 131 and 135 has increased, necessitating an influx of fluid. Such influx is facilitated by vent 122 which simply prevents any vacuum or pressure established within this cavity from delaying operation of the assembly.

In FIG. 10 is shown the position which is reached by application of pressure to port 128, causing an increase of pressure in the chamber adjacent end wall 126. Fluid pressure thus applied acts against piston 131 which moves toward and contacts the extension 137 of piston 135, moving shaft 130 and piston 135 toward end wall 127. The shaft also carries piston 132 toward that end wall. Motion of piston 131 is positively determined by abutment against the radially inwardly extending portion 120 of ring 118. Again, it will be observed that the decrease of volume between pistons 135 and 131, resulting in an increase of pressure therein, is vented through vent 122 to prevent any delay in the action of the apparatus, and that the increased volume between pistons 132 and 136 causes an influx of air though vent 124, again preventing any delay due to the creation of a vacuum between these components. It will be observed that these vents would normally be provided, and would function similarly, whether the primary motive power for the fluid actuated cylinders is pneumatic or hydraulic in nature. The volume to which these vents is exposed is never subjected to either venting or pressurized fluid used as the motive power for the system.

It will further be noted that the three positively determined positions described herein have no relationship to pressure balancing and do not involve the use of any springs whatsoever.

A similar function can also be employed using a combination of single acting cylinders which have attributes somewhat similar to the double acting cylinder previously described but have an additional flexibility and capability which is not shared by the double acting apparatus of FIGS. 7-10. A single acting cylinder in accordance with this invention is shown in FIGS. 11-14. Referring specifically to FIG. 11 and the left hand portion of FIG. 12, a single acting cylinder of this type is seen to include a cylindrical housing 145 which, together with end walls 146 and 147, defines a cylindrical chamber within which are pistons 148 and 149. Piston 148 is disc-like in configuration and is provided with an annular groove having a sealing ring 150. Piston 149 has a disc-like portion and a sealing ring 151 but also is provided with an extension 152 which is in the nature of a sleeve. An output shaft 153 extends through a bore 154 which extends through sleeve 152 and piston 149 to permit shaft 153 to extend therethrough and into piston 148 to which the shaft is fixedly attached.

The end of sleeve 152 extends through end wall 147 and beyond that end wall and is provided with an enlarged portion 155. Portion 155 can be integrally formed with the sleeve but can also be an internally threaded attachment with the end of the sleeve being externally threaded so that 155 can be rotated to adjust the stroke of the apparatus. The length of sleeve 152 in such a situation would be initially selected at a length suitable to provide such adjustment.

End wall 146 is provided with a port 156 and end wall 147 is provided with a port 157, these ports being in communication with the interior of the cylinder to permit venting or pressurization of the end portions thereof, as required.

As will be seen in FIG. 12, application of fluid pressure at port 157 and venting of port 156 will permit the pistons to assume the position shown in the left hand portion of FIG. 12 wherein piston 149 has moved as far to the left as it can, limitation of that motion being determined by enlarged portion 155 which functions as a stop member. Pressurization of port 156 and venting of 157 will cause both pistons to move to the right as far as possible, i.e., to contact with end wall 147, unless otherwise limited by the load connected thereto. Thus, the space between pistons 148 and 149 is not exposed to the pressure system which controls the operation of these pistons and, to prevent any build up of positive or negative pressure therein, venting is accomplished through the enlarged bore 154 which surrounds shaft 153. That bore can be made more effective as a vent by grinding a flat portion on one side of shaft 153 or by providing a groove in bore 154 through which air can freely pass. End wall 147, however, must be provided with a suitable seal to permit a sliding relationship between the end wall and sleeve 152 but to prevent the escape of pressure therefrom.

As indicated above, application of pressure to one or the other of the ports in the single acting cylinder causes the apparatus to assume either one of two positions in which the piston 149 is as shown in FIG. 12 or is fully extended to the right as shown in the left hand portion of FIG. 14. Another position which can be assumed by application of external force to shaft 153 is shown in the left hand portion of FIG. 13 in which piston 148 is moved to a location adjacent end wall 146. This constitutes a third positively determined position which is limiting in the sense that there is physical abutment between the piston and the end wall. It is in movement to this position that venting through the sleeve is particularly important.

While the piston can be used alone, it is best and most flexibly employed in conjunction with a second identical apparatus indicated in FIG. 12 at 160. Unit 160 is provided with pressure ports 161 and 162, a piston 163 attached to shaft 164 and a piston 165 having a sleeve 166 extending through the end wall and terminating in an enlarged portion 167. Shafts 153 and 164 are connected to a load operating device indicated generally at 168 which can be, and is illustrated as, a transmission actuating member of a type which would be used when mounting the disclosed apparatus on top of an existing transmission to convert it from manual to automatic operation. In this case, a dog 166 would protrude downwardly into the transmission to engage and operate the rails and forks therein.

In normal operation of a combined apparatus such as shown in 12–14, vents 157 and 162 would be connected together and would be vented together or else concurrently connected to a source of fluid under pressure together. Application of fluid pressure concurrently to ports 157 and 162 causes the apparatus to assume the neutral position shown in FIG. 12 wherein pistons 149 and 165 are moved to their furthest in positions (into the cylinders) with motion positively limited by enlarged portions 155 and 167.

Application of fluid pressure to port 161 and venting of all other ports produces the situation shown in FIG. 13 wherein fluid pressure is supplied to piston 163, causing movement to the left of pistons 163, 165, load operating device 168, shaft 164 and 153 and piston 148. As shown in FIG. 13 dog 169 is thus moved to the position farthest to the left.

Pressurization of port 156 and venting of all other ports permits the apparatus to assume the exact opposite position in which piston 148 is moved to its right hand position, dog 169 is also moved to its farthest right position and pistons 165 and 163 are moved to their position farthest to the right. Each of these positions is positively determined by physical abutment, utilizing no pressure balancing or springs whatsoever.

A typical truck transmission system with which the invention can be employed is shown in FIG. 15. As seen therein, a drive shaft 175 provides the power input from the engine to a main transmission indicated generally at 176, the output of this transmission being connected directly to an auxiliary transmission 177 which, for practical purposes, is essentially a single unit with the main transmission. The output from the auxiliary transmission appears on a shaft 178 which is connected in a conventional fashion to the rear axle to drive the vehicle.

Shifting of the main transmission is normally accomplished by movement of a main transmission shift lever 179, the lower portion of which operates shift rails, one of which is seen at 180, having devices extending into the transmission to move the movable gear portions thereof. Similarly, the auxiliary shift lever is connected to a linkage indicated generally at 181 which is coupled through a cover 182 on the auxiliary transmission to a similar assembly of rails 183 and 184 which permits movement of the movable portions of the auxiliary transmission.

This arrangement, as previously described, places the two shift levers relatively close to each other so that the driver can simultaneously move the levers when a double shift is required.

The apparatus of the present invention can be employed as schematically indicated in FIG. 16 wherein the top portions and cover plates of the transmission have been removed and replaced by multiple cylinder units 186 and 187 which contain multiple cylinders such as those schematically illustrated at 40–44 in FIG. 1 and of a type shown in either FIGS. 7–10 or FIGS. 11–14. As illustrated in FIG. 16, units of the type shown in FIGS. 11–14 are contemplated with the housings therefor essentially centrally disposed over the downwardly extending linkages into the transmission. If cylinder units of the type shown in FIGS. 7–10 are employed the housing units would be offset so that the mechanical operators connecting the output shafts of these cylinder units to the transmission would extend downwardly from an end of, rather than from the center of, the cylinder units.

Suitable fluid conduits indicated generally at 188 and 189 interconnect the various portions of the cylinders to the valve units previously described, which valve units can be located, along with a source of fluid pressure, at any convenient location. Electrical connections can then extend into the driver's compartment from the valve units to a push button selector.

While FIGS. 15 and 16 represent the apparatus as it might be employed in converting a transmission of an existing and conventional type to a fluid operated apparatus, modifying only the upper extremities of the transmission housings, it will be recognized that a transmission initially manufactured with the fluid units in mind might assume a configuration permitting a more compact overall construction without significantly departing from the principles of operation shown in these Figures.

FIGS. 17 and 18 illustrate one form of selector mechanism 53 which can be employed with the system as described with reference to FIG. 2. In FIGS. 17 and 18 the apparatus is seen to include a housing 190 having a front panel 191 which is removable for access to the interior of the unit. A push button 54 extends through an opening in an upper wall of housing 190 and is representative of a plurality of such push buttons, the number employed being dependent upon the number of shift positions in the transmissions. It will be recognized that, as previously indicated, two identical units such as unit 53 can be employed, one for the main transmission and one for the auxiliary transmission, if desired.

Button 54 includes an upper cylindrical portion having a tapered lower face 192 and a stem 193 which is of significantly reduced diameter. A tape frustoconical cam actuating portion 194 is connected to the stem and has an upper portion of a diameter substantially equal to the diameter of button 54 and a lower portion which is equal to or smaller than the diameter of stem 193. An extended stem 195 protrudes downwardly from can 194 and extends through an opening 196 in a guide plate 197 attached to a wall of housing 190. A compression coil spring 198 surrounds stem 195 and extends between plate 197 and cam 194, urging the button and its associated components in an upward direction. In the bottom of the housing a switch, such as the switch 50 previously referred to, is provided. The switch is of a conventional type having a housing 199 and an operating button 200 which extends through an upper wall of the housing and is movable therein to operate the circuit-completing portions within the housing. An operating lever 201 is pivotally mounted at 202 and is movable between the position illustrated in FIG. 17 and a downward position, illustrated in phantom, in which the switch elements are closed to complete a circuit. Arm 201 is operated by stem 195 when the push button assembly is moved to its lowest position to cause this switch operation.

A latch plate indicated generally at 205 is fixedly attached to an axle 206 which extends through end walls of housing 190 to permit pivotal movement of plate 205 between the two positions illustrated in FIG. 17, one in solid and one in phantom lines. An extension coil spring 207 is connected between the plate and a wall of housing 190 for the purpose of urging the plate in the direction of the position shown in solid lines.

The plate has a generally Z-shaped cross section including a substantially horizontal top portion 208, the distal edge of which is slightly tapered and is in contact with cam portion 194 of the push button and also in contact with similar cam portions of the other push buttons in the housing. A second horizontal portion 209 protrudes horizontally from axle 206 and constitutes a switch actuating arm. A diagonal interconnecting portion 210 joins the two horizontal portions of the latch plate and is also connected to axle 206.

An inwardly extending ledge 211 of housing 190 supports a switch such as switch 55 which has a movable operating button 212 protruding from one face thereof. Switch 55, as shown in FIGS. 17 and 18 is a slide switch of a type which is movable to at least two, but preferably three, positions by movement of operating button 212, where upon the button and the switch remain in the position to which it has been moved until further operated upon. In its uppermost position, as illustrated, the button is in contact with switch operating arm 209 of the latch plate. A solenoid 65 is mounted in the bottom of housing 190 and includes an energizing winding surrounding a movable plunger 214 which moves upwardly when solenoid 65 is energized. The upper end of plunger 214 is in a position to contact button 212 and move it to its upper-most position. An extension coil spring 215 surrounds plunger 214 and extends through a small opening therein to return the plunger to its downward position when the solenoid is de-energized.

The apparatus, as illustrated in FIG. 18, is repetitive in some aspects but not in all. In particular, a plurality of push buttons having downwardly extending stems and cam devices are included, each in a position to operate the elongated latch plate 205. The downwardly extending stem 195 is also provided on the lower end of each of the push buttons and a switch such as switch 50 with its operating arm and the like is provided so that the operation of each push button operates a different switch. However, only one switch 55 is provided, as illustrated in the circuit diagram of FIG. 2, as is only one solenoid 65. Thus, arm 209 is unique in the sense that it only has one switch to operate.

To describe the operation of the apparatus of FIGS. 17 and 18, it will be assumed that the devices are occupying the positions illustrated in solid lines. Push button 54 is then moved in the direction of arrow 216, causing stem 195 to operate arm 201 and actuate switch 50. As the push button is depressed cam surface 194 causes plate 205 to rotate about axle 206 against the urging of spring 207 until the push button is pushed sufficiently far for the plate to enter the recess adjacent stem 193 formed by the gap between surface 192 and the upper portion of cam 194, at which time the latch plate enters the space and holds push button 54 in its downward position. While the push button is being depressed the latch plate is being moved from the position shown in solid lines to the position shown in phantom lines, permitting lever arm 209 to move button 212 to the lower position, thereby moving switch 55 to the neutral position discussed with reference to FIG. 2. When the latch plate enters the recess in push button 54 and latches the push button in its downward position, arm 209 returns to its uppermost position but switch button 212 remains in its lower position momentarily. Then, when the clutch switch is actuated, again as described with reference to FIG. 2, the neutral valve is operated, the neutral switches are actuated by the cylinders returning to their neutral positions, and solenoid 65 is operated, causing plunger 214 to extend upwardly moving push button 212 and switch 55 to the shift position shown in FIG. 2, its uppermost position shown in FIGS. 17 and 18. This energizes the main air cylinder 66 and, through the circuit completed by switch 50 which is being held in its downward closed position by stem 195, energizes solenoid 67 in the valve control unit, permitting the selected shift to occur. The clutch is then released and the clutch switch opened, de-energizing the circuit of FIG. 2. The selector mechanism then remains in the position described until a different push button is depressed at which time latch plate 205 is pivoted to the position shown in phantom lines in FIG. 17, where upon push button 54 is released from its downward latched position and urged upwardly by spring 198 to its initial position, ready for a new shift selection. It will be observed that a completely neutral position can be selected simply by partially depressing any selector button to a position in which latch plate 205 releases any or all previously latched buttons but not sufficiently far to latch the newly depressed button. As previously indicated, the apparatus of FIGS. 17 and 18 also includes a neutral button which has as its sole function the movement of plate 205 to move switch 55 to the neutral position. No switch 50 would be associated with that button since no other ratio is being selected by operation of that neutral button.

FIGS. 19 and 20 show a shift selector control unit which can be employed as an alternative to the push button selector unit illustrated in FIGS. 17 and 18, this selector unit being usable in conjunction with a control circuit illustrated in the schematic diagram of FIG. 21 in place of the control circuit shown in the schematic diagram of FIG. 2. In the control unit 217 shown in FIGS. 19 and 20 there is a main housing 218 which is generally triangular in shape and includes a flat bottom wall 219. As depicted, the unit is intended to be placed with wall 219 in a substantially horizontal plane, but there is no reason why that wall could not be placed in an essentially vertical plane, or any angle in between, depending upon the convenience of installation in the cab of a truck. A continuous wall extends perpendicular to bottom wall 219 and forms side walls 220 and 221, a relatively short end wall 222 and a relatively long arcuate end wall 223. Wall 223 is provided with a plurality of spaced apart downwardly extending arcuate recesses 224 which define selector positions. An intermediate substantially horizontal wall 225 extends roughly parallel to wall 219 and divides the body into a lower closed portion and an upper open portion, the lower closed portion having a series of valve chambers such as chamber 226 which are equally spaced adjacent recesses 224 near wall 223. At the opposite end of the body, near wall 222, there is a chamber 227 which is defined by walls 219, 225 and 222 and by a vertical divider 228 which extends between walls 219 and 225. An upstanding annular wall 229 extends through wall 225 from chamber 227 and surrounds a circular opening 230 which extends between chamber 227 and the upper open portion of the body. Opening 230 defines a pivot axis for the selector mechanism and receives an axle 231 of a selector arm assembly indicated generally at 232. Axle 231 is provided with an annular recess which receives a snap ring 233 to prevent the axle from moving upwardly and out of opening 230. An enlargment 234, which can be integrally formed with the axle or placed thereon as a snap ring or the like limits downward movement of the axle.

Each of the valve cavities such as 226 is formed in a manner similar to the openings in the valve units discussed with reference to FIGS. 3–6, each cavity including an enlarged lower portion 236 which is joined by a frustoconical bearing seat surface 237 to an intermediate smaller cylindrical portion 238. The upper portion 239 of the cavity is joined to portion 238 by a frustoconical valve seat 240, the upper portion being open at its upper end to the open upper portion of the body 218, this opening being surrounded by a short upstanding annular wall 241. Portion 239 of the cavity is vented to atmosphere through a port 242 and the lower enlarged portion 236 of the cavity is connected to air under pressure through a port 243.

The cavity is also provided with a central port 244 which joins the cavity approximately midway in the smaller diameter portion 238 and connects that portion to a conduit leading to a control port on one of the operating cylinders.

A valve body 246 includes a central, substantially cylindrical portion which is fluted to permit fluid conduction between one end and the central port, and enlarged end portions 247 and 248 which are joined to the central portion by frustoconical valve surfaces 249 and 250, respectively. A compression coil spring 251 is provided in cavity 226 and extends between wall 219 and the bottom of the valve body to urge the body upwardly so that valve surface 250 is in contact with valve seat 237 unless the valve body is being otherwise acted upon.

Selector assembly 232 includes a generally L-shaped portion 255 having a vertical arm 256 which extends upwardly from axle 231 and a horizontal arm 257 which extends substantially parallel to wall 225. Arm 256 supports a solenoid 258 having a plunger 259 which is movable in a horizontal plane when the solenoid is energized. Electrical conductors 260 extend from the solenoid and through a central opening in axle 231 to control circuits, to be described.

Arm 256 also is provided with a spring support arm 261 to which a leaf spring 262 is attached.

Arm 257 supports a slide switch 263 which has an operating button 264 extending upwardly therefrom. A box-like switch operator 165 has a substantially upper portion which is provided with an interior cavity 266 which fits over and mates with button 264. Operator 265 also has downwardly extending skirts 267 which maintain the operator in alignment with the sides of the switch. Inwardly extending flanges can be provided on the lower edges of skirts 267 to extend slightly under the edges of switch body 263 to maintain the operator in sliding alignment with the switch body, as shown in FIG. 20a.

It will be recognized that the arms 256 and 257 and the devices supported thereon are attached to axle 231 and are rotatable about the axis of axle 231 within the limits defined by upstanding walls 220 and 221 of body 218. Actuation and precise positioning of this structure is afforded by an operating lever 270 which is pivotally connected to arm 257 by a pin 271 which extends through arm 257 and through the bifurcated ends 272 of arm 270. A switch operator cam 273 extends rearwardly from arm 270 toward switch operator 265 so that when the arm is pivoted about pin 271 cam 273 contacts operator 265 and causes it to move toward solenoid 258, operating switch 263. A valve operating stem 275 extends perpendicular to lever 270, downwardly, and is dimensioned to protrude into opening 239 and contact the upper enlarged end 247 of a valve body. An extension 276 of the lever is dimensioned to be received in arcuate recess 224 and terminates in a knob 277 of a convenient size and shape to be grasped and manually moved by the truck operator.

As shown in FIG. 19, there are several positions, seven being shown, to which lever 270 and its associated equipment can be moved, each of these positions being defined by an arcuate recess 224 and a valve cavity surrounded by an upstanding wall 241, the center line of each valve cavity and each associated arcuate recess being aligned on a radius extending from the axis of axle 231.

While the operation of this apparatus is believed to be obvious from the foregoing description of the structure, a sequence of operation will be briefly described. In the position shown in FIG. 20, air under pressure is supplied through port 243 from a source of fluid under pressure and passes between valve seat 237 and valve surface 250 along the flutes of body 246 to port 244 from which it is conducted by a conduit, not shown, to an appropriate valve shift cylinder of one of the types previously described. The valve body is maintained in the position shown by downward pressure of stem 275, the stem and lever 270 being maintained in this position by the downward pressure of leaf spring 262. In order to accomplish a shift, knob 277 is grasped and moved upwardly in the direction of arrow 278, causing cam 273 to contact and move switch operator 265, sliding the switch to a "neutral" position. Lever 270 and arm assembly 255 is then rotated about the axis of axle 231 to a different one of the valve cavities where upon it is released, placing extension 276 in the arcuate recess 224 associated with that cavity. Stem 275 depresses the valve body to the position shown and the apparatus is ready for a shift. As will be described with reference to the schematic diagram, but similar in operation to the previously described shift mechanism, the electrical and pneumatic portions of the system are not yet actuated, awaiting depression of the transmission clutch. A clutch switch energizes a neutral relay in a control unit, permitting fluid pressure to move the cylinders to their neutral positions, the arrival thereat being detected by neutral switches. Upon completion of this "neutral switch" circuit, solenoid 258 is energized, causing stem 259 to be extended toward lever 270. Stem 259 contacts and moves switch operator 265, causing the slide switch to be returned to the shift position shown in FIG. 20, in which position a valve control unit is caused to supply fluid under pressure to port 243, which pressure is then applied to port 244 and to the conduit leading to a cylinder capable of moving the transmission to its new gear ratio position. It will be recognized that each valve body not actually being depressed by stem 275 is retained in its uppermost position by spring 251, permitting communication of its conduit 244 with the vent port 242 so that each cylinder port not being supplied with air under pressure is automatically vented in a manner similar to the operation of the push button shift selector mechanism.

A schematic diagram usable with the apparatus of FIGS. 19 and 20 is shown in FIG. 21, this being a somewhat simpler electrical diagram because a greater portion of the control function is performed by the additional valves in unit 217. As shown in FIG. 21, a clutch switch 58 controls the connection of the circuit to electrical energy through a fuse 59 to a battery indicated generally at 60. When closed, the clutch switch supplies electrical energy to the movable contact of shift-neutral switch 263 which, as discussed with reference to FIG. 20, is movable to its neutral position by operation of lever 270 and to the shift position by energization of solenoid 258. In the neutral position, switch 263 supplies energy to a solenoid 280 which mechanically actuates a neutral valve 281. In the shift position, switch 263 supplies energy to a solenoid 282 which operates a main air pressure valve 283. Solenoid 258 is energized by current supplied through a plurality of series-connected neutral switches 284 which detect the arrival at neutral position of the various actuating cylinders of the system, as previously described.

While the single acting cylinders described with reference to FIGS. 11-14 can be employed in substantially the same manner as the single acting cylinder assemblies previously discussed, the single acting cylinders have the additional attribute of significant flexibility in arrangement, an example of which is shown in FIG. 22. As illustrated therein, a single acting cylinder schematically shown at 300 is pivotally mounted on a base plate 301 at a point 302 so that the cylinder itself is capable of rotation about point 302 without translational movement. Similarly, a single acting cylinder 303 is mounted for pivotal movement about a point 304 on base plate 301. Each of these single acting cylinders is of the type described in FIGS. 11-14, cylinder 300 having an output shaft 305 and one piston within the cylinder having a sleeve with an enlarged end portion 306, shaft 305 passing through the sleeve and being connected to the other piston within the cylinder. Similarly, piston 303 has an output shaft 310 connected to one piston within the cylinder, the other piston being connected to a sleeve 311 having an enlarged end 312.

For purposes of example only, the pistons are shown as having their output shafts coupled to a simulated load such as a steering mechanism, this being illustrated as a plate 314 which is mounted for pivotal movement about an axle 315 on plate 301, the direction of the plate being additionally indicated by an arrow 316 inscribed thereon. This load might be viewed as a boat rudder or other device the angular orientation of which is to be controlled by the pistons. Output shafts 305 and 310 are pivotally connected to plate 314 at points on either side of axle 315.

In the solid lines of FIG. 22 a neutral position is illustrated in which the output shafts of the two pistons are extended equal amounts, the pistons within the cylinders being in the positions illustrated in FIG. 12. By application of fluid pressure to a port in cylinder 303 at the opposite end from the output shaft, shaft 310 is extended by movement of both pistons, causing sleeve 311 and enlarged portion 312 to protrude from cylinder 303. Whether or not any fluid pressure is applied to the port of cylinder 300 adjacent the output shaft end, pivotal motion of plate 314 causes output shaft 305 to be retracted, this motion also necessitating pivotal movement of the cylinder around its pivot point. Full extension of shaft 310, as observed in FIG. 22, causes the connection point of the output shaft with plate 314 to move to an overcenter position, this overcenter position being defined as one in which the pivot point of one output shaft crosses a line defined by the center line of the opposite output shaft, this center line being indicated by the line 318 in FIG. 22.

The uniqueness of this situation will be illustrated by the fact that the two two-port cylinders each having two positions to which they can be positively moved and placed in a situation such as that shown in FIG. 22 would not be able to recover from an overcenter position such as this without a more complicated system of pistons and ports. However, application of fluid pressure to the forward (output shaft) end of cylinder 303 causes retraction from the overcenter position without difficulty. The additional flexibility of movement of the output shaft piston behind its normal "neutral" position also permits the uniqueness of the situation to arise since retraction can occur beyond, or behind, the usual positively established "back" or retracted position. It is only because of this additional movement available to the piston connected to the output shaft that the variation in positions can be arrive at. Thus, plate 314 can be moved to three independent positions, each positively located by the abutment of pistons against limiting walls in the cylinders and involving no spring action or balancing of pressures.

The apparatus illustrated in FIG. 22 has particular application in the present context to those transmissions in which the operating linkage for the gear-moving forks is caused to extend laterally through the side of the transmission housing rather than being operated through the top of the housing. In adapting the pistons and cylinders of the present invention to an existing transmission of this type, it is possible to employ an arrangement using the principles of FIG. 22 with two single acting cylinders without modifying the control circuitry, selector mechanism, fluid conducting conduits or other apparatus as previously described.

While certain advantageous embodiments have been chosen to illustrate the invention it will be understood by those skilled in the art that various changes and modifications can be made therein without departing from the scope of the invention as defined in the appended claims.

What is claimed is:

1. A fluid actuated cylinder and piston positioning assembly having three positive positions comprising the combination of
   a cylinder having end walls;
   a shaft;
   first and second pistons attached to said shaft and movable therewith;
   third and fourth pistons slidably mounted on said shaft between said first and second pistons with said third piston adjacent said first piston and said fourth piston adjacent said second piston;
   first stop means attached to and extending into said cylinder between said first and third pistons for limiting axial motion of said first and third pistons;
   second stop means attached to and extending into said cylinder between said second and fourth pistons for limiting axial motion of said second and fourth pistons;
   means interposed between said third piston and said first piston and movable with said third piston for reaching beyond said first stop means and contacting and moving said first piston;
   means interposed between said fourth piston and said second piston and movable with said fourth piston for reaching beyond said second stop means and contacting and moving said second piston;
   first, second and third means on said cylinder for passing fluid under pressure respectively between said third and fourth pistons and axially beyond the outer limits of motion of said first and second pistons, whereby said assembly assumes three different positively established positions in response to the application of fluid pressure to any one of said first, second and third means with the other two vented.

2. An assembly according to claim 1 wherein said means interposed between said third and first pistons is fixedly attached to said third piston, and said means interposed between said second and fourth pistons is fixedly attached to said fourth piston.

3. An assembly according to claim 1 wherein said cylinder includes
   means defining first and second vent ports adjacent said first and second stop means for venting the changing volume between said first and third pistons and said second and fourth pistons, respectively.

4. An assembly according to claim 2 wherein each of said third and fourth pistons comprises
   a first cylindrical body having a central bore, an annular peripheral groove and an annular internal groove in said bore; and
   sealing rings disposed in each of said grooves;
   and wherein each of said means interposed between said third and fourth pistons and the respective associated ones of said first and third pistons each comprises
   a second cylindrical body of significantly smaller outer diameter than its associated piston and having a central bore.

* * * * *